United States Patent
Kannan et al.

(10) Patent No.: US 11,374,764 B2
(45) Date of Patent: Jun. 28, 2022

(54) CLOCK-SYNCED TRANSIENT ENCRYPTION

(71) Applicant: Salesforce.com, Inc., San Francisco, CA (US)

(72) Inventors: Prashanth Kannan, San Mateo, CA (US); Prabhjot Singh, Union City, CA (US)

(73) Assignee: salesforce.com, Inc., San Francisco, CA (US)

( * ) Notice: Subject to any disclaimer, the term of this patent is extended or adjusted under 35 U.S.C. 154(b) by 280 days.

(21) Appl. No.: 16/530,773

(22) Filed: Aug. 2, 2019

(65) Prior Publication Data

US 2021/0036862 A1 Feb. 4, 2021

(51) Int. Cl.
*H04L 9/32* (2006.01)
*H04L 9/08* (2006.01)
*H04L 9/40* (2022.01)

(52) U.S. Cl.
CPC .......... *H04L 9/3239* (2013.01); *H04L 9/0819* (2013.01); *H04L 9/0869* (2013.01); *H04L 63/166* (2013.01)

(58) Field of Classification Search
CPC ... H04L 9/3239; H04L 9/0819; H04L 9/0869; H04L 63/166
See application file for complete search history.

(56) References Cited

U.S. PATENT DOCUMENTS

| | | | |
|---|---|---|---|
| 9,584,495 B2 * | 2/2017 | Parrish | H04L 9/065 |
| 2008/0022374 A1 * | 1/2008 | Brown | H04W 12/069 |
| | | | 726/5 |
| 2009/0123131 A1 * | 5/2009 | Morioka | H04L 65/4076 |
| | | | 386/241 |
| 2009/0245516 A1 * | 10/2009 | Ravikiran | H04L 9/0869 |
| | | | 380/268 |
| 2012/0063597 A1 * | 3/2012 | Tropp | H04L 9/0861 |
| | | | 380/259 |
| 2013/0097308 A1 * | 4/2013 | Le | H04L 43/028 |
| | | | 709/224 |
| 2014/0281523 A1 * | 9/2014 | Golino | H04W 12/104 |
| | | | 713/168 |
| 2015/0113264 A1 * | 4/2015 | Wang | H04L 63/02 |
| | | | 713/151 |
| 2016/0359820 A1 * | 12/2016 | Bender | H04L 9/0891 |
| 2017/0163607 A1 * | 6/2017 | Skuratovich | H04L 9/0819 |
| 2017/0228391 A1 | 8/2017 | Savla et al. | |
| 2019/0104121 A1 * | 4/2019 | Khandani | H04L 9/0891 |
| 2019/0155938 A1 | 5/2019 | Kudriavtsev et al. | |

(Continued)

OTHER PUBLICATIONS

Te-Kwei Wang, Fan-Ren Chang "Network Time Protocol Based Time-Varying Encryption System for Smart Grid Meter", by Wang et al., IEEE, 2004, p. 99-104 (Year: 2004).*

*Primary Examiner* — Catherine Thiaw
(74) *Attorney, Agent, or Firm* — Kwan & Olynick LLP

(57) ABSTRACT

A request for a transaction between a client system and a server system may be processed. The transaction may be associated with transmission of data between the client system and the server system. The data may be encrypted using a transient encryption key to form encrypted data. The transient encryption key may be a synced-clock random number configured to automatically change when a designated time interval elapses. The encrypted data may be transmitted between the client system and the server system.

19 Claims, 7 Drawing Sheets

(56) References Cited

U.S. PATENT DOCUMENTS

| | | |
|---|---|---|
| 2019/0230081 A1 | 7/2019 | Singh et al. |
| 2019/0230169 A1 | 7/2019 | Elangovan et al. |
| 2019/0356641 A1* | 11/2019 | Isaacson .............. G06Q 20/384 |
| 2019/0394031 A1* | 12/2019 | Deng .................... H04L 9/0643 |

* cited by examiner

CLOCK-SYNCED TRANSIENT ENCRYPTION

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to encryption and more specifically to clock-synced transient encryption.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks. A variety of security threats such as man-in-the-middle-style attacks may be present in such a computing environment.

BRIEF DESCRIPTION OF THE DRAWINGS

The included drawings are for illustrative purposes and serve only to provide examples of possible structures and operations for the disclosed inventive systems, apparatus, methods and computer program products for clock-synced transient encryption. These drawings in no way limit any changes in form and detail that may be made by one skilled in the art without departing from the spirit and scope of the disclosed implementations.

DETAILED DESCRIPTION

Figure 1:
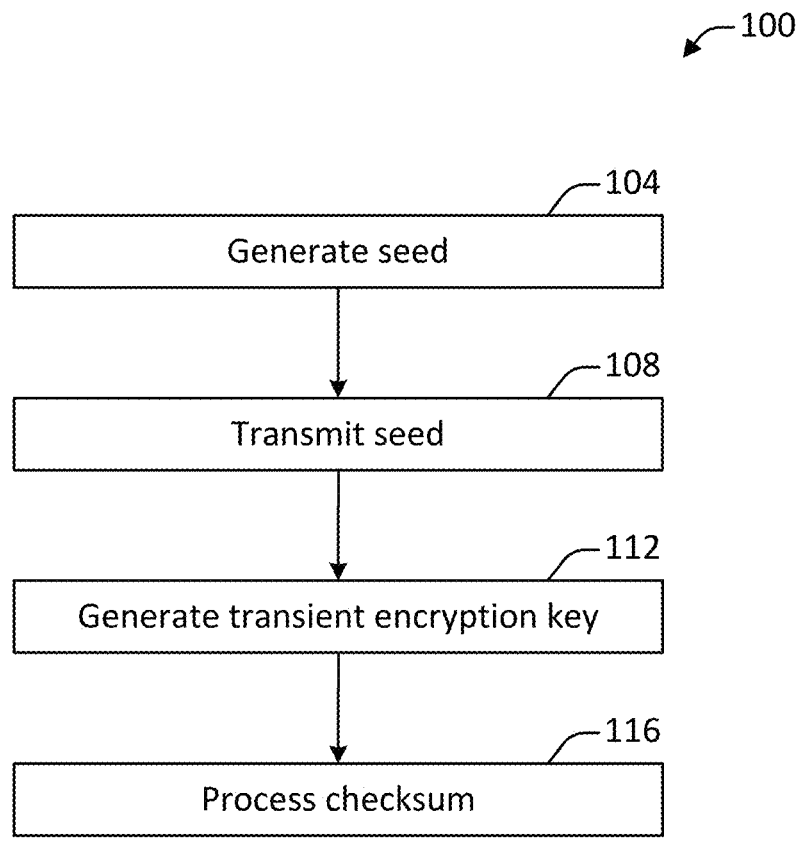
FIG. 1 shows a flowchart of an example of a method for initializing clock-synced transient encryption, performed in accordance with some implementations.

Some implementations of the disclosed systems, apparatus, methods and computer program products are configured for implementing clock-synced transient encryption. As described in further detail below, such clock-synced transient encryption may provide application layer security to client-server transactions. By way of example, using the techniques discussed below, a security system may be established such that transactions between a client system and a server system are encrypted and decrypted using a clock-synced (e.g., using a clock accessible to the client system and the server system) transient encryption key derivable by the client system and the server system.

While transport layer security (TLS) provides many solutions to a variety of security concerns, TLS-based schemes alone are unable to mitigate man-in-the-middle-style attacks when a trusted certificate has been compromised. By way of illustration, Fanny is a customer of Mansfield Bank. Fanny uses the Mansfield Bank web application for most of her banking needs. Unfortunately, Fanny's digital certificate for the Mansfield Bank web application has been compromised. As a result, Mrs. Norris is able to act as a man-in-the-middle and intercept the transactions between Fanny's computing device and the Mansfield Bank web application. In doing so, Mrs. Norris is able to steal Fanny's log-in information and steal from Fanny's accounts at Mansfield Bank.

Some existing techniques such as certificate pinning may be used mitigate man-in-the-middle-style attacks when a digital certificate is compromised; however, such approaches are ineffective against an attacker who has access to a sensitive channel during first trust establishment. Continuing with the above example, since she had access to Fanny's computing device for an extended period of time, Mrs. Norris already compromised Fanny's web browser when first trust was established between Fanny's computing device and the Mansfield Bank web application. Therefore, any sensitive data that passes between Fanny's web browser and the Mansfield Bank application server (e.g., her login information) will not be protected using these conventional techniques.

By contrast, using the disclosed techniques, man-in-the-middle-style attacks may be thwarted, even when a digital certificate is compromised. Moreover, such techniques may be seamlessly integrated within an existing web application, Returning to the above example, as discussed below, a seed value may be stored on a Mansfield Bank application server. The seed value may transmitted to Fanny's computing device through an uncompromised channel to which Mrs. Norris does not have access (e.g., via a short message service (SMS) text message.) In some implementations, the seed value may instead be transmitted via the same channel as normal client-server communication (e.g., via a web browser. By way of example, the seed value may be transmitted to a client system via a web browser when trust on first use (TOFU) is been established and/or depending on security requirements. For instance, when a laptop is first provisioned to an employee at an organization, a seed value may be safely placed on the laptop via most channels, since the laptop has not been out of the hands of trusted members of the organization.

Returning to the above example, the seed value may then be stored on Fanny's computing device (e.g., in her browser cache.) A transient encryption key may be generated in tandem on Fanny's computing device and the Mansfield Bank Servers. As discussed in further detail below, the transient encryption key may be generated using time-based one-time password (TOTP) techniques that apply a secure hashing algorithm (SHA) using the seed value and a current time-stamp. This process results in a transient encryption key that may be automatically changed periodically after a designated time interval elapses (e.g., 30 seconds). As discussed below, the transient encryption key may be a "synced-clock random number" in that the time-stamp used to generate the transient encryption key may be based on a particular clock that is accessible to the Mansfield Bank servers and Fanny's computing device. Since Fanny's computing device and the Mansfield Bank servers have access to both the seed value and the time stamp used to generate the transient encryption key, data associated with all transactions between Fanny's computing device and the Mansfield Bank servers may be encrypted using the transient encryption key. Because the seed value is not known to Mrs. Norris, she is unable to decrypt any data she intercepts between Fanny's computing device and the Mansfield Bank servers. Furthermore, because the transient encryption key changes frequently, even if Mrs. Norris were able to decrypt a small amount of data associated with a particular client-server transaction, she would not be able to decrypt data associated with future client-server transactions.

The disclosed techniques can be used to protect data in a wide range of scenarios. Returning to the above example, the IT team at Fanny's place of employment may have access to Fanny's digital certificates via her laptop. As such, Henry, a member of the IT team, may attempt to steal Fanny's banking information. As discussed above, Mansfield Bank may use the synced-clock transient encryption techniques discussed above. As a result, even though he has access to Fanny's digital certificate, Henry will not be able to decrypt the data associated with transactions between Fanny's laptop and Mansfield bank.

Figure 2:
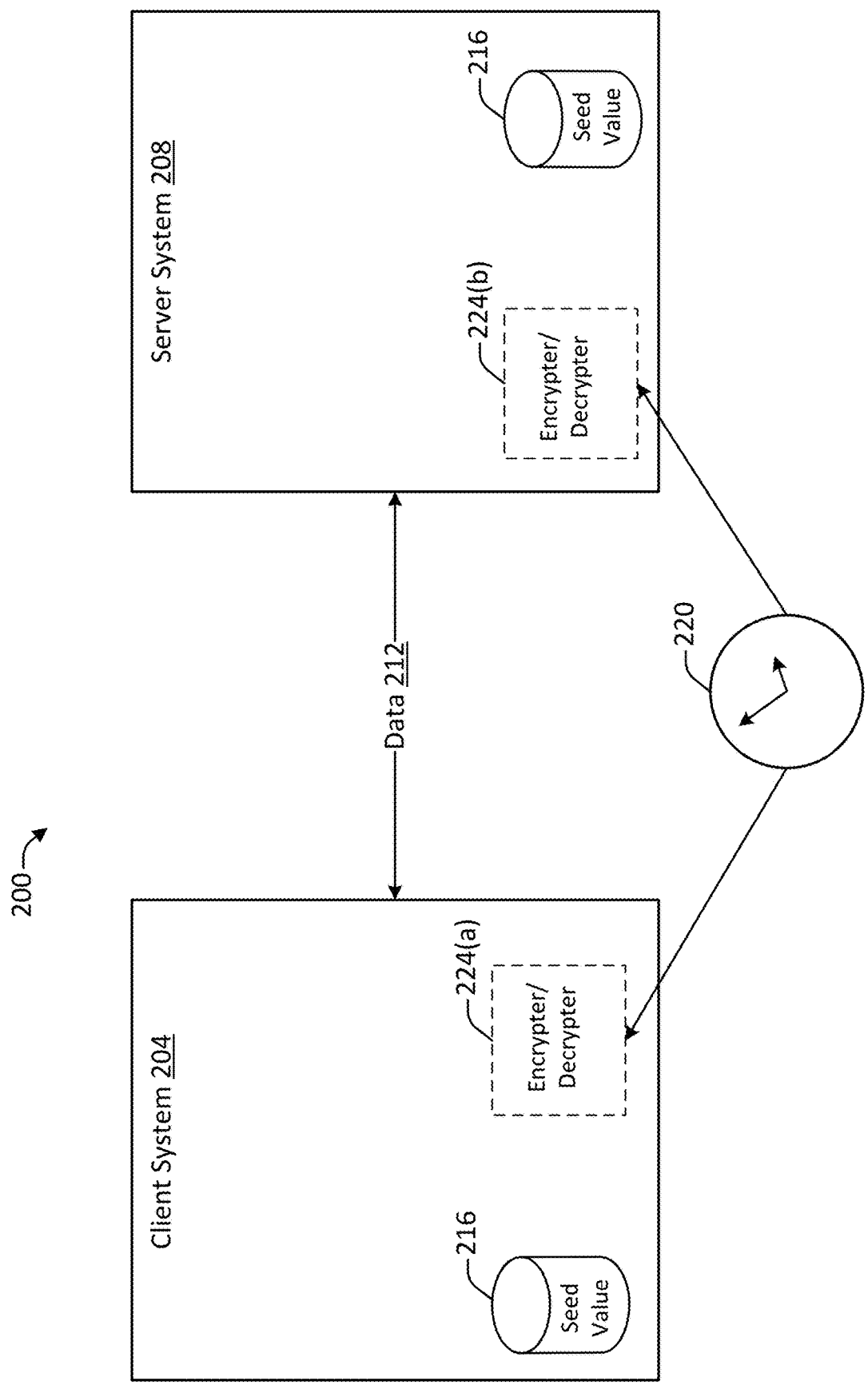
FIG. 2 shows a block diagram of an example of a configuration, which includes a security system for encrypting and/or decrypting data using clock-synced transient encryption, in accordance with some implementations.

FIG. 1 shows a flowchart of an example of a method 100 for initializing clock-synced transient encryption, performed in accordance with some implementations. FIG. 1 is described in the context of FIG. 2, which shows a block diagram of an example of a configuration 200, which includes a security system for encrypting and/or decrypting data using clock-synced transient encryption, in accordance with some implementations.

At 104 of FIG. 1, a seed value is generated. By way of example, in response to a request from a client system to initiate a secure relationship with a server system, the server system may generate a seed value, as described above. By way of illustration, client system 204 of FIG. 2 may be interacting with a web application hosted by server system 208. As transactions occur between the client system 204 and the server system 208, the client system 204 and the server system 208 may exchange data 212. As described above, a man-in-the-middle-style hacker may attempt to intercept the data 2:12. As such, the user may of the client system 204 may wish to initiate a secure relationship with the server system 208. By way of illustration, the user may install a browser plug-in on the client system 204. The browser plug-in may be configured to encrypt and decrypt the data 212 using clock-synced transient encryption techniques described herein. In response to installation of the browser plugin on the client system 204, the server system may generate seed value 216. The seed value may 216 be any entity capable of being hashed to create an encryption key as described herein. For example, the seed value 216 may be a random alpha-numeric entity such as a large random number. In some implementations, the seed value 216 may be capable of being encoded or stored in a variety of manners (e.g., in a quick response (OR) code.)

A person having skill in the art can appreciate that the disclosed techniques may be applied to any type of client-server transaction. As such, the client system 204 and the server system 208 may include any configuration of devices or systems capable of communicating via a client-server model. By way of illustration, the client system 204 may include a wide variety of client devices such as a desktop, a laptop, a mobile device such as a smartphone or tablet, a wearable device such as a smartwatch or smart glasses, a set-top box, etc. Similarly, the server system 208 may include a wide variety of server devices such as an application server hosting a customer relationship management (CRM) platform and/or a social networking system provided to a plurality of tenant organizations via an on-demand computing environment such as a platform provided Salesforce.com® (as discussed in further detail below), a server hosting a web application associated with a bank, a server storing medical records, a server storing credit cart data, etc.

Returning to FIG. 1, at 108 the seed value is transmitted. By way of illustration, the server system 208 of FIG. 2 may transmit the seed value 216 to the client system 204. The seed value 216 may be stored on the client system 204, e.g. in the browser cache on the browser in which the browser plug-in discussed above is installed.

The seed value 216 may be transmitted from the server system 208 to the client system 204 via a trusted channel. For example, such a trusted channel may include any channel separate from the channel by which data 212 is transmitted between the server system 208 and the client system 204 during ordinary client-server transactions. By way of illustration, as discussed above, the data 212 may be associated with transactions occurring via a web browser. Therefore, the seed value 216 may be transmitted from the server system 208 to the client system 204 via any other channel other than the web browser. For instance, in some implementations, the seed value 216 may be transmitted from the server system 208 to the client system 204 via a variety of channels such as a SMS text message, an application that is separate from the web browser, an email, a telephone call, a QR code sent via a channel that is separate from the web browser, a separate device such as a Universal Serial Bus (USB) stick, another third party communication channel, etc.

In some implementations, the seed value 216 may itself be a temporary entity. For instance, the seed value 216 may be configured to automatically expire after a particular period of time and/or after occurrence of a particular event, By way of example, Mary may be using a particular computing device for limited time (e.g., she may be borrowing the computing device, she may be renting the computing device, she may be using the computing device in her capacity as a temporary worker, etc.). As such, a seed value may be transmitted to Mary's computer using the above-described techniques; however, the seed value may be configured to expire automatically when Mary returns the computing device and/or after a certain time period elapses.

At 112 of FIG. 1, a transient encryption key is generated. By way of example, the client system 204 and the server system 208 of FIG. 2 may each separately generate the transient encryption key by applying a secure hash algorithm (SHA) (e.g., any suitable SHA such as SHA-256 or SHA-512, SHA-3 such as SHA3-256 or SHA3-512, etc.) to the seed value 216 and a current time-stamp generated based on a designated clock 220. One having skill in the art can appreciate that the disclosed techniques are not limited to the SHAs described above and can be implemented using any suitable cipher such as Saisa20.

The designated clock 220 may be any clock to which the server system 208 and the client system 204 both have access. For instance, some examples of such clocks may include Greenwich Mean Time (GMT), Indian Standard Time (IST), Pacific Daylight Time (PDT), any oscillator to which the frequency is available to the client system 204 and the server system 208, etc.

In some implementations, when the clock of the client system 204 and the clock of the server system 208 do not match, an error will be generated. As such, the client system 204 and the server system 208 can re-synchronize to the designated clock 220 such that the clock-synced transient encryption techniques described herein will continue to function properly.

After a given time interval the transient encryption key may be automatically changed using the TOTP techniques described in the preceding paragraph. By way of example, every 30 seconds the client system 204 and the server system 208 may each separately automatically re-calculate the transient encryption key by applying a SHA to the seed value 216 and a new time-stamp generated based on a current time stamp retrieved from designated clock 220 at the time of re-calculation of the transient encryption key. As such, the transient encryption key may be automatically changed irrespective of the Internet connectivity of client system 204. By way of example, a browser plug-in operating on the client system 204 may automatically re-apply a SHA to the seed value 216 and the time stamp at any designated time interval without any communication with the server system 208. Similarly, a module on the server system 208 may automatically re-apply a SHA to the seed value 216 and the time stamp without any communication with the client system 204.

The time interval after which the transient encryption key is changed may vary across implementations. For example, such a time interval may include any amount of time, e.g., 1 ms, 30 seconds, 1 minute, 2 hours, etc. In some implementations, the time interval may be determined based on weighing security concerns with computational practicality. By way of illustration, automatically changing the transient encryption key every micro-second may be computationally impractical. On the other hand, automatically changing the transient encryption key only once a day may allow a hacker to have sufficient time to determine the transient encryption key, giving him or her access to the data associated with an entire day of client-server transactions.

Returning to FIG. 1, at 116, a checksum is processed. By way of example, the client system 204 of FIG. 2 may generate a checksum of an initial value of the transient encryption key. The checksum of the initial value of the transient encryption key may then be sent to the server system 208 as acknowledgement that initialization of a secure relationship between the client system 204 and the server system 208 has occurred.

One having skill in the art can appreciate that use of a checksum is one of many mechanisms for evaluating that the seed value has been applied correctly. By way of example, the seed may be checked manually, once the seed value is stored, a notification may be automatically sent for approval, etc.

After such initialization the browser plug-in may no longer interact with the server system 208. As described above, the server system 208 and the client system 204 may separately and continuously re-calculate the transient encryption key every time a time interval elapses, causing the transient encryption key to be automatically changed every time the time interval elapses. Since the transient encryption key is based on the seed value 216 (which is stored on both the server system 208 and the client system 204) and the designated clock 220 (which is accessible to both the server system 208 and the client system 204) the transient encryption key calculated by the client system 204 will match the transient encryption key calculated by the server system 208 at any given time. Accordingly, the data 212 transmitted from the client system 204 to the server system 208 can be encrypted by encrypter/decrypter 224($a$) of the client system 204 using the transient encryption key and decrypted by encrypter/decrypter 224($b$) of the server system 208 using the transient encryption key as described further below in the context of FIG. 3, Similarly, the data 212 transmitted from the server system 208 to the client system 204 can be encrypted by the encrypter/decrypter 224($b$) of the server system 208 using the transient encryption key and decrypted by the encrypter/decrypter 224($a$) the client system 204 using the transient encryption key as described further below in the context of FIG. 3.

Figure 3:
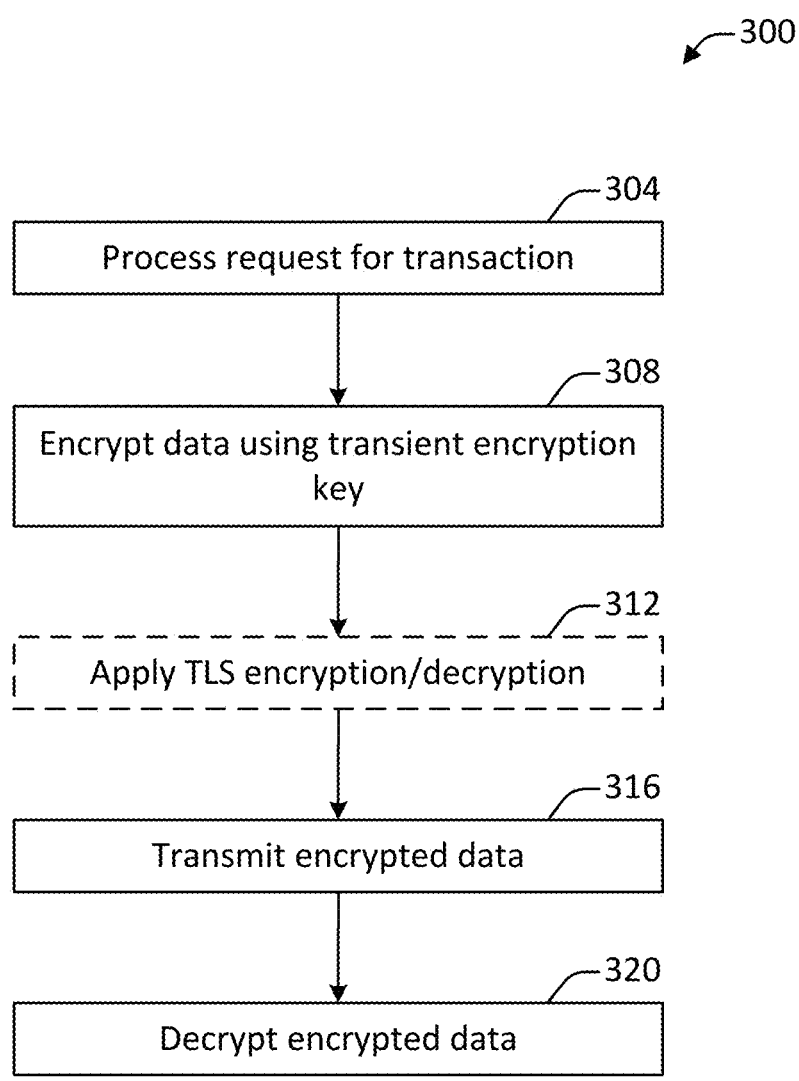
FIG. 3 shows a flowchart of an example of a method for encrypting and/or decrypting data using clock-synced transient encryption, performed in accordance with some implementations.
Figure 4:
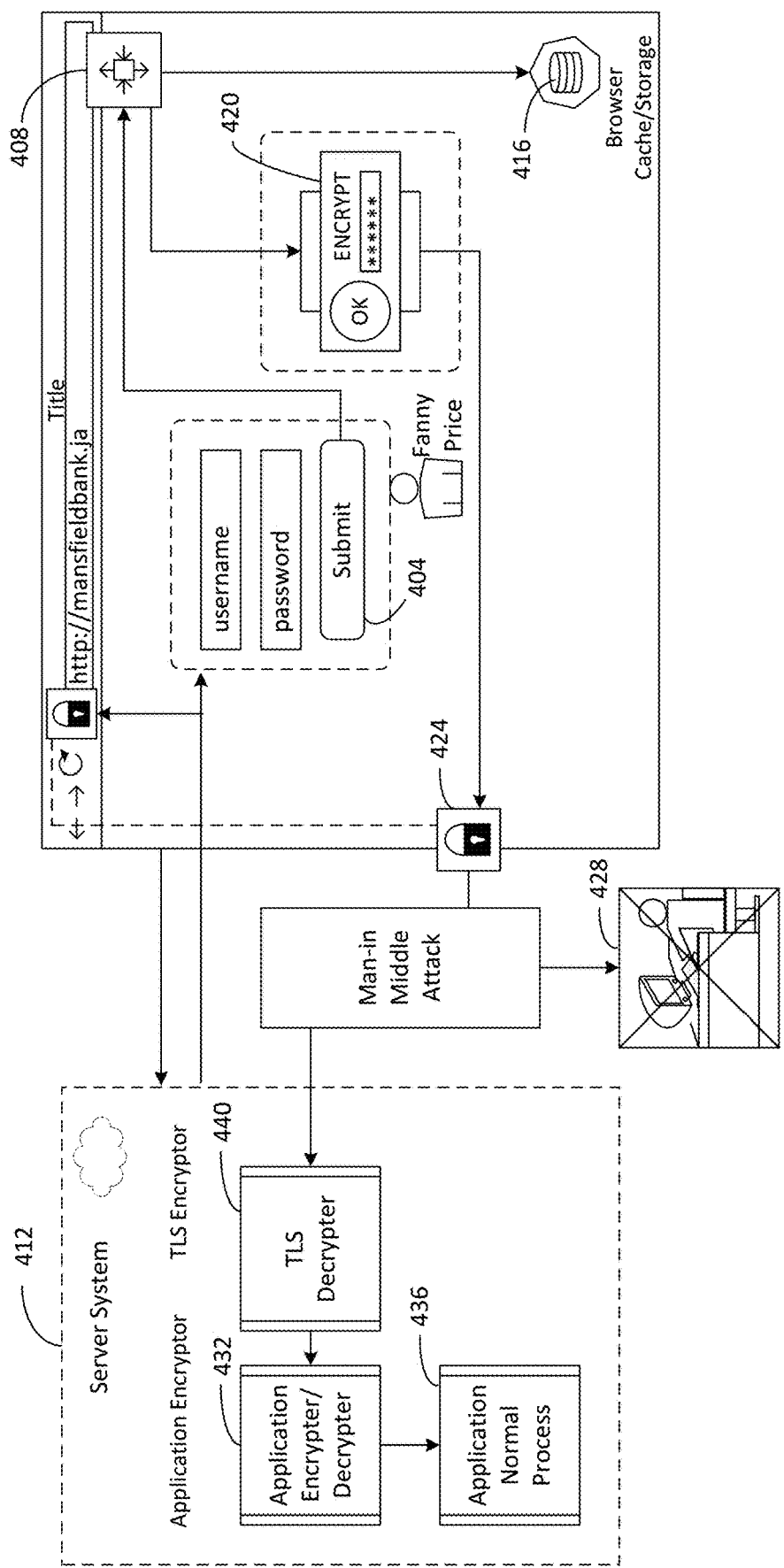
FIG. 4 shows a block diagram of an example of encryption and decryption of data using clock-synced transient encryption during a particular client-server transaction, in accordance with some implementations.

FIG. 3 shows a flowchart of an example of a method for encrypting and/or decrypting data using clock-synced transient encryption, performed in accordance with some implementations. FIG. 3 is described in the context of FIGS. 2 and 4. FIG. 4 shows a block diagram of an example of encryption and decryption of data using clock-synced transient encryption during a particular client-server transaction, in accordance with some implementations.

At 304 of FIG. 3 a request for a transaction is processed. By way of example, in FIG. 4, Fanny is logging into the Mansfield Bank web application via browser window 400, which is a browser window of a web browser operating on Fanny's laptop. When Fanny types in her login information (e.g., her username and password) and clicks submit button 404, Fanny's login request may be automatically intercepted by browser plug-in 408. The browser plug-in 408 may automatically intercept Fanny's login request prior to any data associated with the transaction (e.g., Fanny's username and password) being transmitted to Mansfield Bank application server 412.

In some implementations, the browser plug-in 408 may be configured to intercept all transactions between Fanny's laptop and the Mansfield Bank application server 412. As such, the browser plug-in 408 may apply the disclosed application layer encryption techniques to all data being transmitted between Fanny's laptop and the Mansfield Bank application server 412.

Returning to FIG. 3, at 308, the data associated with the transaction of 304 is encrypted using the transient encryption key. Returning to the above example, the browser plug-in 408 may retrieve Fanny's seed value from browser cache 416. As discussed above, the transient encryption key may be generated by applying a SHA, using the seed value and a time-stamp, which is based on a designated clock accessible to the browser plug-in 408 and to the Mansfield Bank application server 412. The browser plug-in 408 may then encrypt Fanny's username and password using the transient encryption key using standard encryption techniques to generate encrypted data 420.

Optionally, at 312 of FIG. 3, TLS encryption/decryption is applied to the encrypted data of 316. By way of example, applying, before the encrypted data 420 of FIG. 4 are transmitted from Fanny's laptop to the Mansfield Bank application server 412, TLS encryption 424 may be applied. Similarly, when the encrypted data 420 is received at the Mansfield Bank application server 412, TLS decrypter 440 can perform TLS decryption on the encrypted data 420, as described in further detail below.

While current protocols are associated with the routine use of transport layer encryption, one having skill in the art can appreciate that the application layer encryption techniques discussed herein may be independent from TLS encryption. As such, in some implementations, data may be encrypted using a transient encryption key and transmitted between a client system and a server system without the additional layer of TLS encryption.

At 316 of FIG. 3, the encrypted data of 312 is transmitted between the client system and the server system. By way of example, the encrypted data 420 of FIG. 4 is transmitted from Fanny's laptop to the Mansfield Bank application server 412. As described above, since the transient encryption key is generated based on a seed value that is accessible to the browser plug-in 408 and the Mansfield Bank application server 412 but not to man-in-the-middle-style hacker 428, hacker 428 will not be able to decrypt the encrypted data 420. Moreover, as discussed above, even if the hacker 428 is able to somehow determine the transient encryption key at a given point in time, he or she will be unable to determine future values of the transient encryption key as the transient encryption key is automatically changed periodically.

At 320, of FIG. 3, the encrypted data of 312 is decrypted. By way of example, as discussed above in the context of FIGS. 1 and 2, the Mansfield Bank application server 412 of FIG. 4 may store Fanny's seed value. As such the Mansfield Bank application server 412 may periodically re-calculate the transient encryption key by applying a SHA, using the seed value and the time-stamp based on the designated clock accessible to the browser plug-in 408 and to the Mansfield Bank application server 412. Application encrypter/decrypter 432 may then decrypt the encrypted data 420 with the transient encryption key using standard decryption techniques. Once the encrypted data 420 is decrypted, the application encrypter/decrypter 432 may pass Fanny's username and password to application processes 436. Optionally, if TLS encryption was also applied to the encrypted data 420, TLS decrypter 440 may decrypt the TLS encryption of encrypted data 420.

While the transaction discussed above in the context of FIG. 4 relates to clock-synced transient encryption of data being transmitted from a client system to a server system, one having skill in the art can appreciate that method 300 of FIG. 3 can be applied bidirectionally. By way of example, any data being transmitted from the Mansfield Bank application server 412 may be encrypted using the transient encryption key prior to transmission to Fanny's laptop, and decrypted by the browser plug-in 408 operating on Fanny's laptop using the above-described techniques.

A person having skill in the art can appreciate that the above-described techniques can be used to provide application-layer security to an existing web application without having to overhaul the web application. By way of illustration, as discussed above, the security systems disclosed herein may simply be implemented using a browser plug-in. As such, this scheme could work on top of any web application capable of using the browser in which such a browser plug-in is installed.

While some of the security systems disclosed herein are described as being implemented via browser plug-ins, one having skill in the art can appreciate that the disclosed techniques may be applied in a variety of manners, and can be applied to any client-server communication. For instance, upon wide-scale acceptance of the disclosed techniques, the security systems described above may be implemented in a web browser itself. For example the web browser could store seed values associated with a variety of entities such as web applications. Transactions between a client system operating the web browser and the web applications may be automatically encrypted using the above-described techniques. In yet another implementation, the disclosed techniques may be implemented directly in a mobile application. By way of example, a mobile application operating on a user's client system could store the user's seed value and could encrypt and decrypt all data associated with any transactions between the client system and any servers implementing the mobile application using the above-described techniques. One having skill in the art can appreciate that, in some implementations, secure storage of a mobile application may be desirable.

Figure 5:
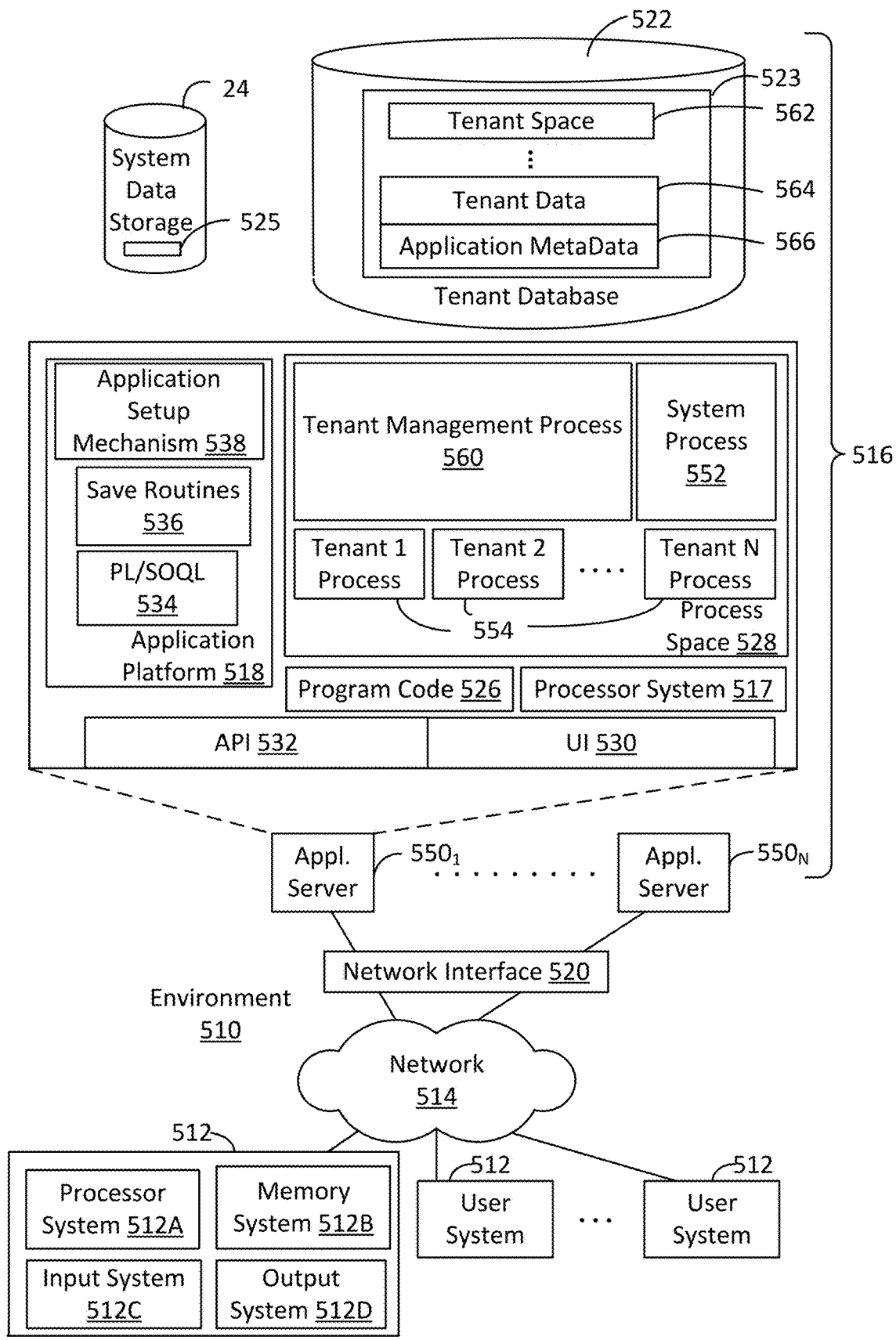
FIG. 5 shows a block diagram of an example of an environment that includes an on-demand database service configured in accordance with some implementations.

FIG. 5 shows a block diagram of an example of an environment 510 that includes an on-demand database service configured in accordance with some implementations. Environment 510 may include user systems 512, network 514, database system 516, processor system 517, application platform 518, network interface 520, tenant data storage 522, tenant data 523, system data storage 524, system data 525, program code 526, process space 528, User Interface (UI) 530, Application Program Interface (API) 532, PL/SOQL 534, save routines 536, application setup mechanism 538, application servers 550-1 through 550-N, system process space 552, tenant process spaces 554, tenant management process space 560, tenant storage space 562, user storage 564, and application metadata 566. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 516, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 516. Such applications may be developed by the database service provider or by users or third-party application developers accessing the service. Application platform 518 includes an application setup mechanism 538 that supports application developers' creation and management of applications, which may be saved as metadata into tenant data storage 522 by save routines 536 for execution by subscribers as one or more tenant process spaces 554 managed by tenant management process 560 for example. Invocations to such applications may be coded using PL/SOQL 534 that provides a programming language style interface extension to API 532. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 566 for a subscriber making such an invocation. Such system processes may also manage execution of application metadata 566 as an application in a virtual machine.

In some implementations, each application server 550 may handle requests for any user associated with any organization. A load balancing function (e.g., an F5 Big-IP load balancer) may distribute requests to the application servers 550 based on an algorithm such as least-connections, round robin, observed response time, etc. Each application server 550 may be configured to communicate with tenant data storage 522 and the tenant data 523 therein, and system data storage 524 and the system data 525 therein to serve requests of user systems 512. The tenant data 523 may be divided into individual tenant storage spaces 562, which can be either a physical arrangement and/or a logical arrangement of data. Within each tenant storage space 562, user storage 564 and application metadata 566 may be similarly allocated for each user. For example, a copy of a user's most recently used (MRLJ) items might be stored to user storage 564. Similarly, a copy of MRU items for an entire tenant organization may be stored to tenant storage space 562. A UI 530 provides a user interface and an API 532 provides an application programming interface to system 516 resident processes to users and/or developers at user systems 512.

System 516 may implement a transient clock-synced encryption system. For example, in some implementations, system 516 may include application servers configured to implement and execute a variety of software applications. The application servers may be configured to provide related data, code, forms, web pages and other information to and from user systems 512. Additionally, the application servers may be configured to store information to, and retrieve information from a database system. Such information may include related data, objects, and/or Webpage content. With a multi-tenant system, data for multiple tenants may be stored in the same physical database object in tenant data storage 522, however, tenant data may be arranged in the storage medium(s) of tenant data storage 522 so that data of one tenant is kept logically separate from that of other tenants. In such a scheme, one tenant may not access another tenant's data, unless such data is expressly shared.

Several elements in the system shown in FIG. 5 include conventional, well-known elements that are explained only briefly here. For example, user system 512 may include processor system 512A, memory system 512B, input system 512C, and output system 512D. A user system 512 may be implemented as any computing device(s) or other data processing apparatus such as a mobile phone, laptop computer, tablet, desktop computer, or network of computing devices. User system 12 may run an Internet browser allowing a user (e.g., a subscriber of an MTS) of user system 512 to access, process and view information, pages and applications available from system 516 over network 514. Network 514 may be any network or combination of networks of devices that communicate with one another, such as any one or any combination of a LAN (local area network), WAN (wide area network), wireless network, or other appropriate configuration.

The users of user systems 512 may differ in their respective capacities, and the capacity of a particular user system 512 to access information may be determined at least in part by "permissions" of the particular user system 512. As discussed herein, permissions generally govern access to computing resources such as data objects, components, and other entities of a computing system, such as a social networking system and/or a CRM database system. "Permission sets" generally refer to groups of permissions that may be assigned to users of such a computing environment. For instance, the assignments of users and permission sets may be stored in one or more databases of System 516. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 516 may provide on-demand database service to user systems 512 using an MTS arrangement. By way of example, one tenant organization may be a company that employs a sales force where each salesperson uses system 516 to manage their sales process. Thus, a user in such an organization may maintain contact data, leads data, customer follow-up data, performance data, goals and progress data, etc., all applicable to that user's personal sales process (e.g., in tenant data storage 522). In this arrangement, a user may manage his or her sales efforts and cycles from a variety of devices, since relevant data and applications to interact with (e.g., access, view, modify, report, transmit, calculate, etc.) such data may be maintained and accessed by any user system 512 having network access.

When implemented in an MTS arrangement, system 516 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization, Thus, some data structures managed by system 516 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 516 may also maintain system-level data usable by multiple tenants or other data. Such system-level data may include industry reports, news, postings, and the like that are sharable between tenant organizations.

In some implementations, user systems 512 may be client systems communicating with application servers 550 to request and update system-level and tenant-level data from system 516. By way of example, user systems 512 may send one or more queries requesting data of a database maintained in tenant data storage 522 and/or system data storage 524. An application server 550 of system 516 may automatically generate one or more SQL statements (e.g., one or more SQL queries) that are designed to access the requested data. System data storage 524 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. A table may include seed values for each user associated with a web application. These seed values may be used, as described above, to generate transient encryption keys. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 6A:
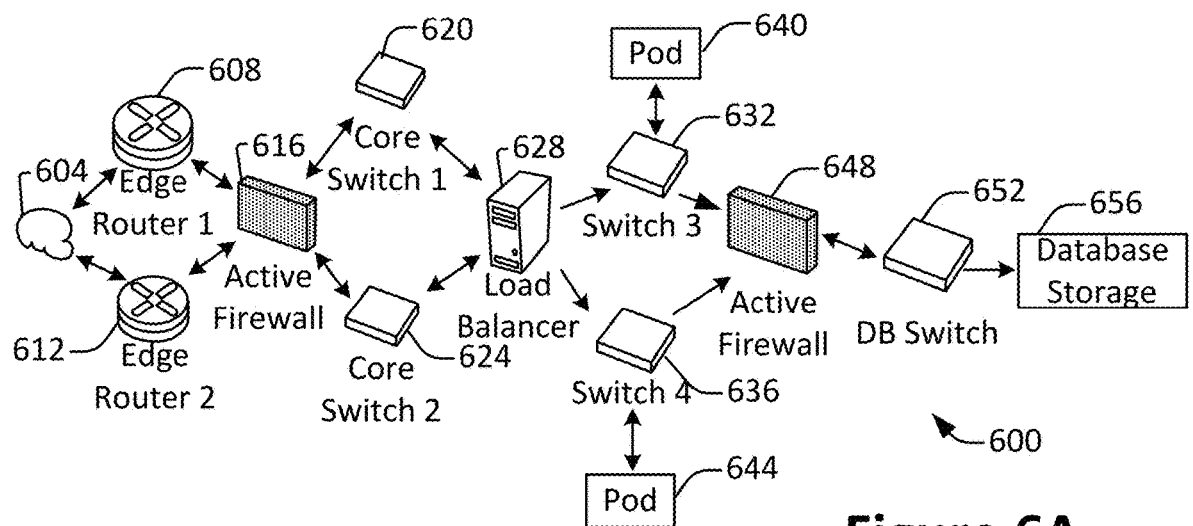
FIG. 6A shows a system diagram of an example of architectural components of an on-demand database service environment, configured in accordance with some implementations.

FIG. 6A shows a system diagram of an example of architectural components of an on-demand database service environment 600, configured in accordance with some implementations. A client machine located in the cloud 604 may communicate with the on-demand database service environment via one or more edge routers 608 and 612. A client machine may include any of the examples of user systems 512 described above. The edge routers 608 and 612 may communicate with one or more core switches 620 and 624 via firewall 616. The core switches may communicate with a load balancer 628, which may distribute server load over different pods, such as the pods 640 and 644 by communication via pod switches 632 and 636. The pods 640 and 644, which may each include one or more servers and/or other computing resources, may perform data processing and other operations used to provide on-demand services. Components of the environment may communicate with a database storage 656 via a database firewall 648 and a database switch 652.

Accessing an on-demand database service environment may involve communications transmitted among a variety of different components. The environment 600 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 6A and 6B.

The cloud 604 refers to any suitable data network or combination of data networks, which may include the Internet. Client machines located in the cloud 604 may communicate with the on-demand database service environment 600 to access services provided by the on-demand database service environment 600. By way of example, client machines may access the on-demand database service environment 600 to retrieve, store, edit, and/or process CRM information.

In some implementations, the edge routers 608 and 612 route packets between the cloud 604 and other components of the on-demand database service environment 600. The edge routers 608 and 612 may employ the Border Gateway Protocol (BGP). The edge routers 608 and 612 may maintain a table of IP networks or 'prefixes', which designate network reachability among autonomous systems on the Internet.

In one or more implementations, the firewall 616 may protect the inner components of the environment 600 from Internet traffic. The firewall 616 may block, permit, or deny access to the inner components of the on-demand database service environment 600 based upon a set of rules and/or other criteria. The firewall 616 may act as one or more of a packet filter, an application gateway, a stateful filter, a proxy server, or any other type of firewall.

In some implementations, the core switches 620 and 624 may be high-capacity switches that transfer packets within the environment 600. The core switches 620 and 624 may be configured as network bridges that quickly route data between different components within the on-demand database service environment. The use of two or more core switches 620 and 624 may provide redundancy and/or reduced latency.

In some implementations, communication between the pods 640 and 644 may be conducted via the pod switches 632 and 636. The pod switches 632 and 636 may facilitate communication between the pods 640 and 644 and client machines, for example via core switches 620 and 624. Also or alternatively, the pod switches 632 and 636 may facilitate communication between the pods 640 and 644 and the database storage 656. The load balancer 628 may distribute workload between the pods, which may assist in improving the use of resources, increasing throughput, reducing response times, and/or reducing overhead. The load balancer 628 may include multilayer switches to analyze and forward traffic.

In some implementations, access to the database storage 656 may be guarded by a database firewall 648, which may act as a computer application firewall operating at the database application layer of a protocol stack. The database firewall 648 may protect the database storage 656 from application attacks such as structure query language (SQL) injection, database rootkits, and unauthorized information disclosure. The database firewall 648 may include a host using one or more forms of reverse proxy services to proxy traffic before passing it to a gateway router and/or may inspect the contents of database traffic and block certain content or database requests. The database firewall 648 may work on the SQL application level atop the TCP/IP stack, managing applications' connection to the database or SQL management interfaces as well as intercepting and enforcing packets traveling to or from a database network or application interface.

In some implementations, the database storage 656 may be an on-demand database system shared by many different organizations. The on-demand database service may employ a single-tenant approach, a multi-tenant approach, a virtualized approach, or any other type of database approach. Communication with the database storage 656 may be conducted via the database switch 652. The database storage 656 may include various software components for handling database queries. Accordingly, the database switch 652 may direct database queries transmitted by other components of the environment (e.g., the pods 640 and 644) to the correct components within the database storage 656.

Figure 6B:
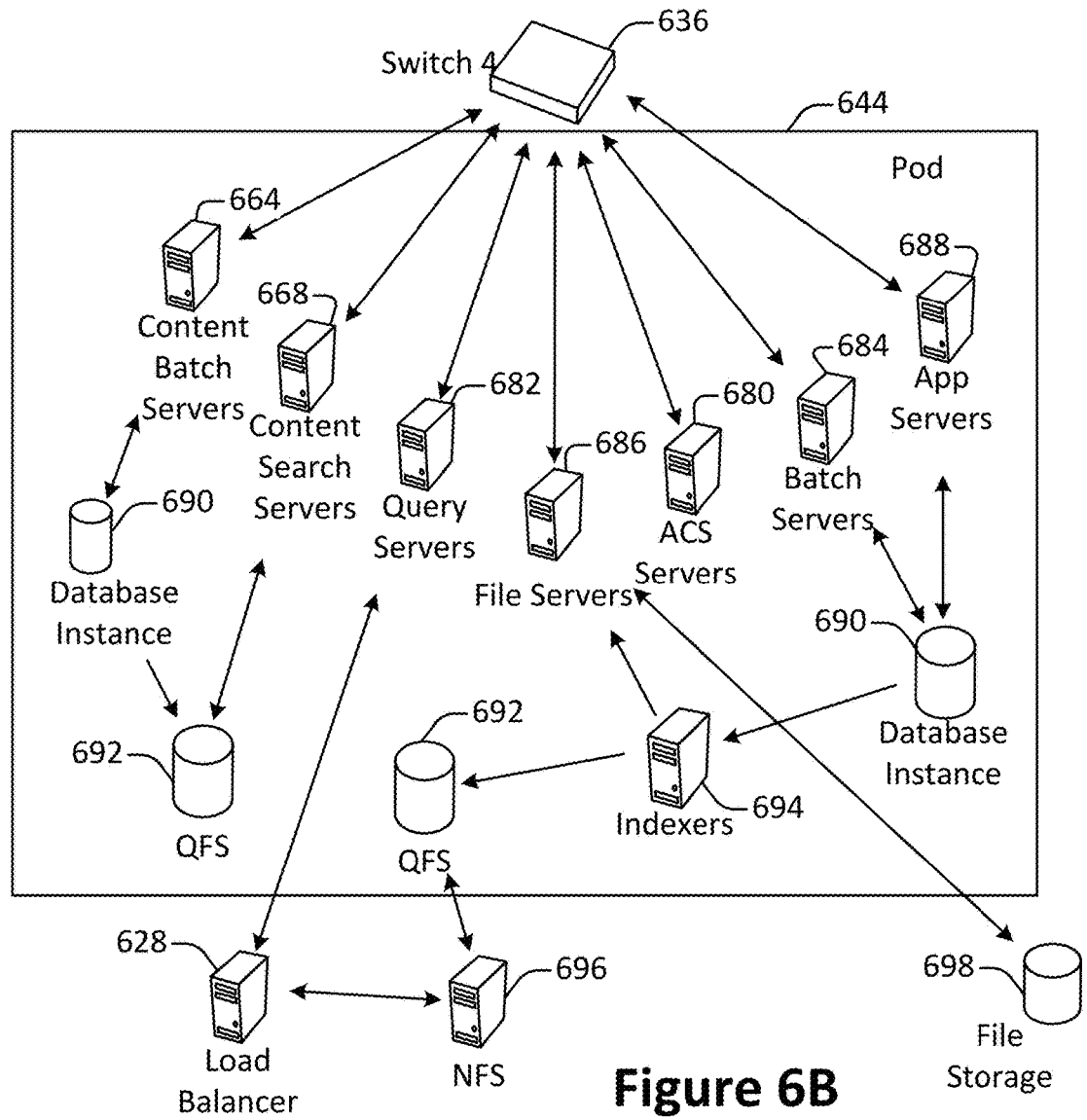
FIG. 6B shows a system diagram further illustrating an example of architectural components of an on-demand database service environment, in accordance with some implementations.

FIG. 6B shows a system diagram further illustrating an example of architectural components of an on-demand database service environment, in accordance with some implementations. The pod 644 may be used to render services to user(s) of the on-demand database service environment 600. The pod 644 may include one or more content batch servers 664, content search servers 668, query servers 682, file servers 686, access control system (ACS) servers 680, batch servers 684, and app servers 688. Also, the pod 644 may include database instances 690, quick file systems (QFS) 692, and indexers 694. Some or all communication between the servers in the pod 644 may be transmitted via the switch 636.

In some implementations, the app servers 688 may include a framework dedicated to the execution of procedures (e.g., programs, routines, scripts) for supporting the construction of applications provided by the on-demand database service environment 600 via the pod 644, One or more instances of the app server 688 may be configured to execute all or a portion of the operations of the services described herein.

In some implementations, as discussed above, the pod 644 may include one or more database instances 690. A database instance 690 may be configured as an MTS in which different organizations share access to the same database, using the techniques described above. Database information may be transmitted to the indexer 694, which may provide an index of information available in the database 690 to file servers 686. The QFS 692 or other suitable filesystem may serve as a rapid-access file system for storing and accessing information available within the pod 644. The QFS 692 may support volume management capabilities, allowing many disks to be grouped together into a file system. The QFS 692 may communicate with the database instances 690, content search servers 668 and/or indexers 694 to identify, retrieve, move, and/or update data stored in the network file systems (NFS) 696 and/or other storage systems.

In some implementations, one or more query servers 682 may communicate with the NFS 696 to retrieve and/or update information stored outside of the pod 644. The NFS 696 may allow servers located in the pod 644 to access information over a network in a manner similar to how local storage is accessed. Queries from the query servers 622 may be transmitted to the NFS 696 via the load balancer 628, which may distribute resource requests over various resources available in the on-demand database service environment 600. The NFS 696 may also communicate with the QFS 692 to update the information stored on the NFS 696 and/or to provide information to the QFS 692 for use by servers located within the pod 644.

In some implementations, the content batch servers 664 may handle requests internal to the pod 644. These requests may be long-running and/or not tied to a particular customer, such as requests related to log mining, cleanup work, and maintenance tasks. The content search servers 668 may provide query and indexer functions such as functions allowing users to search through content stored in the on-demand database service environment 600. The file servers 686 may manage requests for information stored in the file storage 698, which may store information such as documents, images, basic large objects (BLOBs), etc. The query servers 682 may be used to retrieve information from one or more file systems. For example, the query system 682 may receive requests for information from the app servers 688 and then transmit information queries to the NFS 696 located outside the pod 644. The ACS servers 680 may control access to data, hardware resources, or software resources called upon to render services provided by the pod 644. The batch servers 684 may process batch jobs, which are used to run tasks at specified times. Thus, the batch servers 684 may transmit instructions to other servers, such as the app servers 688, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 7:
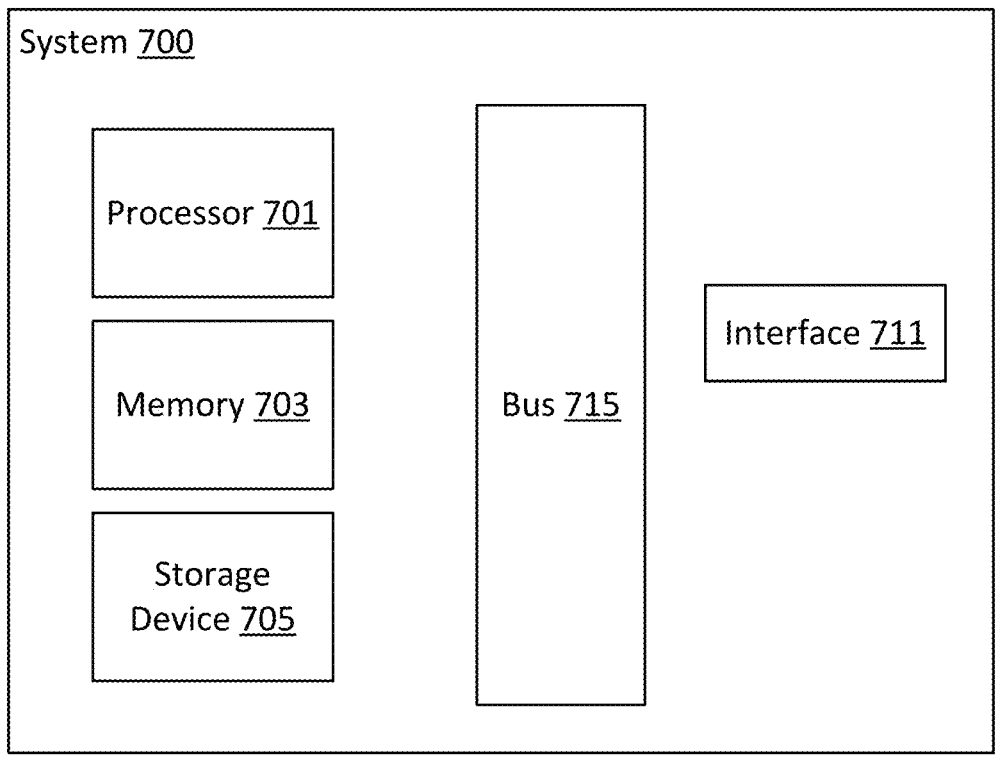
FIG. 7 illustrates one example of a computing device, configured in accordance with one or more embodiments.

FIG. 7 illustrates one example of a computing device. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a database server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701, The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI), These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl, Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A security system comprising one or more hardware processors, the security system being configurable to cause:
after establishing a first channel between a client system and a server system as a trusted channel, transmitting, via the first channel, a seed value from the server system to a cache of a web browser operating on the client system;
processing a request for a transaction between the client system and the server system, the transaction being associated with transmission of data, via the web browser, between the client system and the server system;
using a transient encryption key generated based on the seed value, using one or more processors, encrypting the data to form encrypted data, the transient encryption key being a synced-clock random number configured to automatically change when a designated time interval elapses, the synced-clock random number being accessible to the server system and the client system, the synced-dock random number being based on a designated clock accessible to the server and the client system; and
transmitting the encrypted data from the server system to the client system, the web browser being operable to access the seed value to decrypt the encrypted data using the transient encryption key.

2. The security system of claim 1, the security system further configurable to cause:
generating, based on the seed value and a time-stamp associated with the designated clock, the transient encryption key.

3. The security system of claim 2, the security system further configurable to cause:
evaluating that the seed has been applied correctly by processing a checksum of an initial value of the transient encryption key received from the client system.

4. The security system of claim 2, wherein generating the transient encryption key comprises applying, using the seed value and the time-stamp, a secure hash algorithm (SHA), the time-stamp being based on the designated clock.

5. The security system of claim 1, the security system further configurable to cause:
applying, before transmitting the encrypted data between the client system and the server system, transport layer security (TLS) encryption to the encrypted data.

6. The security system of claim 1, wherein the encrypted data is transmitted between the client system and the server system without TLS encryption.

7. The security system of claim 1, wherein encryption of the data occurs at an application layer associated with a web application being interacted with by a user of the client system, the web application being hosted by the server system.

8. The security system of claim 1, wherein encryption of the data occurs at an application layer associated with a mobile application being interacted with by a user of the client system, the client system being a mobile device.

9. The security system of claim 8, wherein the mobile application comprises a customer relationship management (CRM) platform and/or a social networking system provided to a plurality of tenant organizations via an on-demand computing environment.

10. The security system of claim 1, wherein encrypting the data to form encrypted data is performed by one or more of: a browser plug-in operating at the client system, a web browser operating at the client system, or an application operating at the client system.

11. The security system of claim 9, wherein the security system is configured to automatically intercept further transactions between the client system and the server system.

12. The security system of claim 1, wherein:
the first channel is text message, an application that is separate from the web browser, an email, a telephone call, a QR code, a separate device such as a Universal Serial Bus (USB) stick.

13. A method comprising:
after establishing a first channel between a client system and a server system as a trusted channel, transmitting, via the first channel, a seed value from the server system to a cache of a web browser operating on the client system;
receiving a request for a transaction between the client system and the server system, the transaction being associated with transmission of data, via the web browser, between the client system and the server system;
using a transient encryption key generated based on the seed value, using one or more processors, encrypting the data to form encrypted data, the transient encryption key being a synced-clock random number configured to automatically change when a designated time interval elapses, the synced-dock random number being accessible to the server system and the client system, the synced-dock random number being based on a designated dock accessible to the server and the client system; and
transmitting the encrypted data from the server system to the client system, the web browser being operable to access the seed value to decrypt the encrypted data using the transient encryption key.

14. The method of claim 13, the method further comprising:
generating, based on the seed value and a time-stamp associated with the designated clock, the transient encryption key; and
evaluating that the seed has been applied correctly by processing a checksum of an initial value of the transient encryption key received from the client system.

15. The method of claim 14, wherein generating the transient encryption key comprises applying, using the seed value and the time-stamp, a secure hash algorithm (SHA), the time-stamp being based on the designated clock.

16. The method of claim 13, the method further comprising:
applying, before transmitting the encrypted data between the client system and the server system, transport layer security (TLS) encryption to the encrypted data.

17. The method of claim 13, wherein the encrypted data is transmitted between the client system and the server system without TLS encryption.

18. A computer program product comprising a non-transitory computer-readable medium storing computer-readable program code capable of being executed by one or more processors when retrieved from the non-transitory computer-readable medium, the program code comprising instructions configurable to cause:
after establishing a first channel between a client system and a server system as a trusted channel, transmitting, via the first channel, a seed value from the server system to a cache of a web browser operating on the client system;
processing a request for a transaction between the client system and the server system, the transaction being associated with transmission of data, via the web browser, between the client system and the server system;
using a transient encryption key generated based on the seed value, using one or more processors, encrypting the data to form encrypted data, the transient encryption key being a synced-clock random number configured to automatically change when a designated time interval elapses, the synced-clock random number being accessible to the server system and the client system, the synced-clock random number being based on a designated clock accessible to the server and the client system; and
transmitting the encrypted data from the server system to the client system, the web browser being operable to access the seed value to decrypt the encrypted data using the transient encryption key.

19. The computer program product of claim 18, the instructions further configurable to cause:
generating, based on the seed value and a time-stamp associated with the designated clock, the transient encryption key; and
evaluating that the seed has been applied correctly by processing a checksum of an initial value of the transient encryption key received from the client system.

\* \* \* \* \*